(12) United States Patent
Sandler et al.

(10) Patent No.: US 8,451,333 B2
(45) Date of Patent: May 28, 2013

(54) VIDEO CAPTURE SYSTEM AND METHOD

(75) Inventors: Michael S. Sandler, San Diego, CA (US); Fredrick G. Korfin, San Diego, CA (US)

(73) Assignee: FrostByte Video, Inc., San Diego, CA (US)

(*) Notice: Subject to any disclaimer, the term of this patent is extended or adjusted under 35 U.S.C. 154(b) by 1326 days.

(21) Appl. No.: 11/834,545

(22) Filed: Aug. 6, 2007

(65) Prior Publication Data

US 2009/0040301 A1    Feb. 12, 2009

(51) Int. Cl.
*H04N 5/225* (2006.01)
*G06K 9/00* (2006.01)

(52) U.S. Cl.
USPC ............ 348/169; 348/157; 348/159; 382/103

(58) Field of Classification Search
USPC ................... 348/169, 157–159; 382/103, 143
See application file for complete search history.

(56) References Cited

U.S. PATENT DOCUMENTS

| | | | |
|---|---|---|---|
| 6,778,171 B1* | 8/2004 | Kikinis | 348/169 |
| 2003/0179294 A1* | 9/2003 | Martins | 348/157 |
| 2005/0093976 A1* | 5/2005 | Valleriano et al. | 348/143 |
| 2007/0003146 A1* | 1/2007 | Ko et al. | 382/224 |
| 2007/0039030 A1 | 2/2007 | Romanowich | |
| 2007/0052803 A1* | 3/2007 | Chosak et al. | 348/143 |
| 2007/0091178 A1* | 4/2007 | Cotter et al. | 348/159 |
| 2007/0279494 A1* | 12/2007 | Aman et al. | 348/169 |

OTHER PUBLICATIONS

United States Patent and Trademark Office, First Office Action, U.S. Appl. No. 11/834,535, issued Aug. 21, 2012.

* cited by examiner

*Primary Examiner* — Yasin Barqadle
(74) *Attorney, Agent, or Firm* — Sheppard Mullin Richter & Hampton LLP

(57) ABSTRACT

Video capture systems, methods and computer program products can be provided and configured to capture video sequences of one or more subjects during an activity. The video capture system can be configured to include a communications module that is provided to receive a set of successive frames of video image data of a defined coverage area in an activity location and to receive tracking information indicating a position of the subject in the activity location. A content selection module can be further provided to determine a location of the subject in the defined coverage area based on the tracking information to thereby determine a subset of the image data in one or more received frames, or in a set of frames, of video image data that contains image data of the subject.

34 Claims, 14 Drawing Sheets

VIDEO CAPTURE SYSTEM AND METHOD

RELATED APPLICATIONS

This application is related to co-pending U.S. application Ser. No. 11/834,535, filed on Aug. 6, 2007, entitled "Image Capture System and Method", the entire contents of which incorporated herein by reference.

TECHNICAL FIELD

The present invention relates to motion video and other content items, and more particularly, some embodiments relate to systems and methods for capturing motion content across an environment.

DESCRIPTION OF THE RELATED ART

It is widely believed that the earliest mechanisms for producing two-dimensional images in motion were demonstrated in the 1860s, using devices such as the zoetrope and the praxinoscope. These devices were configured to show still pictures in sequence at a speed fast enough that the images on the stills appeared to be moving. This phenomenon was often referred to as persistence of vision. This principle of persistence of motion provided the foundation for the development of film animation.

With the advent of celluloid film used in photography, it became possible to directly capture objects in motion in real time using similar techniques. Soon thereafter, the motion picture camera allowed the individual frames, or still images, to be captured on film on a reel, which enhanced the usability of the motion video. This quickly led to the introduction of the movie projector that provided the ability to shine light through the processed and printed film, and magnified or projected these images onto a large screen.

Early motion showed an event or action without editing or other special effects. As innovation took hold, new techniques were employed to enhance the enjoyment of the films and the viewing experience overall. For example, one technique strung multiple scenes together so that the moving picture told a story. Another technique evolved to change camera angles or to include camera movement to further enhance the experience. Also, early motion pictures were actually 'silent' movies in that no sound was captured on the film. Theaters often employed a pianist, organist or even a number of musicians to add background music to the film.

In their earliest forms, motion and still picture cameras were large, cumbersome and specialized devices that were not practical for use by consumers at large. Their cost and relative difficulty of use kept them out of the hands of the average consumer. As technology evolved, more simplified versions of still and motion picture cameras eventually became available. This enabled the general consumers to become more involved in still and motion photography for a number of applications and occasions. The eventual ubiquity of the consumer level motion and still photographic equipment has lead to an even greater popularity of content featuring the users themselves, their friends and their family. Birthdays, family outings, ballet recitals, sporting events, school plays, vacations, and countless other events and activities are captured by participants, viewers and attendees in larger numbers than ever.

One perhaps natural outgrowth of this phenomenon, especially in our capitalistic society, is the capture of events for commercial purposes. School plays and musicals are often recorded on film or disk by students or other designated individuals, and DVDs of the event are sold to the families of the student thespians. As another example, roller coasters and other thrill rides often feature still cameras to capture an image of the riders during a more thrilling section of the ride. These images are then offered for sale after the ride so that the rider or her family can keep a picture of the event.

Challenges facing the recording and capture of such events, however, involve the ability to capture a motion video of one or more participants when such participants are moving across a large event area. For example, consider the challenge facing one attempting to capture a motion video when the objective is to record a video of a skier skiing down a large mountain with several different ski trails. A roller-coaster type of solution might provide a still snapshot of the skier at a key point on the mountain such as, for example, at a location where there is a jump. One other solution would be to have a live videographer ski along with the subject skier to 'manually' record the video of the skier. This solution would be expensive and time consuming, and might not lead to desirable results.

Accordingly, one current solution in the market is for people to take their own cameras with them and record their co-participants performing. The disadvantages to this can be numerous. For example: you get no video of yourself, it can be dangerous to perform many sports while carrying and using the camera, you put the camera at risk of damage, in many sports you can't keep up with the people you want to film or they simply are not with you all day long, the moving camera and resulting bouncy image result in a poor video, and most people can't perform a sport and use a camera at the same time. While one or more persons can stand at various locations around a ski resort and shoot video all day long it would be a labor-intensive task to then process the video and split it off into clips of each participant. As one other alternative, ski resorts offer webcams that provide a "big-picture" view of the action on the ski slope but generally these tend to be low resolution and low frame rate cameras.

BRIEF SUMMARY OF EMBODIMENTS OF THE INVENTION

The present invention in one embodiment allows participants to memorialize the excitement of their activity with a personalized video or DVD of themselves having fun and performing out on the open terrain. Cameras can be installed at, for example, fixed locations throughout a sports park or other venue, and video footage is captured throughout the day. By using tracking technology to locate each tracking enabled athlete, a video can be assembled using portions of each camera's video that contain that person. In another embodiment, a person may designate more than one participant whom they would like to include in the video and a composite video can be created to include 'footage' of the identified participants.

Accordingly, a customer will be able to have their performance tracked all day and then receive a video of their performance. In one embodiment, the video equipment can be installed and run by the ski park (or other venue management) or a third party provider, and fees can be charged to the participant or other purchaser for the video. The video can be supplied as an online streaming or downloaded file, or on DVD or other medium that can be picked up at the end of the day, or mailed to the customer.

The invention is described in terms of the ski resort industry. Additional markets for the invention can include skate board parks, BMX parks and auto race tracks, just to name a few. Video editing tools can be provided and be made accessible via the web or other communications interface so users can customize their personal videos with background music, special effects, and so on, or rearrange clips, zoom images, etc.

According to various embodiments of the invention, a video capture system can be provided and configured to capture video sequences of a subject during an activity. In one embodiment, the invention can be configured to include a plurality of video cameras positioned at predetermined locations in an activity area, a tracking device configured to track a location of the subject during the activity, a content storage device communicatively coupled to the video capture devices and configured to store video content received from the video capture devices, and a content assembly device communicatively coupled to the content storage device and to the tracking device, and configured to use tracking information from the tracking device to retrieve video sequences of the subject from the tracking device and to assemble the retrieved video sequences into a composite subject video.

The tracking device can further include a position determination module configured to determine a position of the tracking device; a timing module configured to provide timing information corresponding to the determined positions; and a communications interface configured to communicate time-stamped position information to the content assembly device. The time-stamped information can be directly or indirectly time stamped. In one embodiment, the position determination module of the tracking device comprises a GPS module, or triangulation module.

In one embodiment, a video capture system is configured to capture video sequences of a subject during an activity, and includes: a first communication module configured to receive a set of successive frames of video image data of a defined coverage area in an activity location; a second communication module configured to receive tracking information indicating a position of the subject in the activity location; a content selection module coupled to the first and second communication module and configured to determine a location of the subject in the defined coverage area based on the tracking information to thereby determine a subset of the image data in each received frame of video image data that contains image data of the subject.

In a further embodiment, the content selection module can be further configured to select the determined subset of image data in each received frame and to assemble the selected subsets into a video sequence of the subject. The subset of image data, for example, defines a moving window across the frame. Additionally, different subsets of image data can be determined by the content selection module to track the subject's movement across the frame. The subset of image data can be selected as a defined sector of the frame. The subset of image data can also be a range of pixels of a predetermined size. The size of the range of pixels can be configured to increase as the subject moves closer to the video camera.

In another embodiment, the first communication module is configured to receive image data from a plurality of content capture devices, and each image capture device can have a defined coverage area in the activity location. The content selection module can be further configured to use the tracking information to identify which of the plurality of capture devices include image data of the subject.

In a further embodiment, the system can be configured to include a video camera coupled to the first communication module and further configured to capture the set of successive frames of video image data from the defined coverage area for that camera.

The video capture system can be configured to include a tracking device configured to provide the tracking information. In one embodiment, the tracking device can include a position determination module configured to determine a position of the tracking device; a timing module configured to provide timing information relating to the determined positions; and a communications interface configured to communicate time-stamped position information to the content assembly device.

In still another embodiment, a method of capturing video content of an activity subject, includes obtaining a set of successive frames of video image data of a defined coverage area in an activity location; obtaining tracking information indicating a position of the subject in the activity location; determining a location of the subject in the defined coverage area based on the tracking information to thereby determine a subset of the image data in each received frame of video image data that contains image data of the subject. The method can further include assembling a plurality of determined subsets into a video sequence of the subject. The subset of image data, for example, defines a moving window across the frame. Additionally, different subsets of image data can be determined by the content selection module to track the subject's movement across the frame. The subset of image data can be selected as a defined sector of the frame. The subset of image data can also be a range of pixels of a predetermined size. The size of the range of pixels can be configured to increase as the subject moves closer to the video camera. In a further embodiment, the method can include identifying different subsets of image data from a frame of image data in response to changes in the location of the subject to track movement of the subject image across the frame.

In a further embodiment, the image data can be stored and assembling includes retrieving the identified image data segments from storage for assembly into the video sequence. In yet another embodiment, the video image data can be received from a plurality of content capture devices, and each capture device can have a defined coverage area in the activity location. Additionally, the method can include correlating the tracking information with defined coverage areas to identify which of the plurality of image capture devices include image data of the subject. In one embodiment, the correlating comprises determining a location of the subject based on the tracking information; and comparing the determined location with the coverage areas of the plurality of image capture devices to determine which image capture device captured image data of the subject at the determined location. The operations of determining a location and comparing the determined location with the coverage areas can be repeated for a plurality of subject locations.

In a further embodiment, image data can be stored as image data sets, and the sets can have an associated coverage area and having ascertainable timing information. Timing information associated with the tracking data can be received for the correlation and the correlation can include: determining a location of the subject based on the tracking information; using timing information associated with the tracking information to determine a time at which the subject was at the determined location; comparing the determined location with the coverage areas of the plurality of image capture devices to determine which image capture device captured image data of the subject at the determined location; and using the determined time to identify the image segment or segments from the determined image capture device that correspond to the identified time. The identified image data segments can be retrieved from storage for assembly into the video sequence.

In still a further embodiment, a method of capturing video content of an activity subject includes: obtaining a set of frames of image data for a defined coverage area in an activity location; determining location information identifying a plurality of locations of the subject in the coverage area and a time at which the subject was at each location; for each location, selecting one of the successive frames of data corresponding to the time the subject was at that location and identifying a subset of the image data in the selected frame that contains image data of the subject based on the subject location in the coverage area.

The method can further include assembling a plurality of subsets into a video sequence of the subject. The subset of image data, for example, defines a moving window across the frame. Additionally, different subsets of image data can be determined by the content selection module to track the subject's movement across the frame. The subset of image data can be selected as a defined sector of the frame. The subset of image data can also be a range of pixels of a predetermined size. The size of the range of pixels can be configured to increase as the subject moves closer to the video camera. In a further embodiment, the method can include identifying different subsets of image data from a frame of image data in response to changes in the location of the subject to track movement of the subject image across the frame.

The locations of the subject can be determined using a tracking device that generates tracking information and the tracking information can be used to determine the plurality of locations and wherein the subset of the image data is identified based on the tracking information obtained from the tracking device. The set of frames of image data can be stored in a manner that allows pixel coordinate location to be ascertained for image data contained therein, and the subset of image data can be identified by determining a range of pixel coordinate locations that contain image data of the subject in the selected frame based on the location information.

In a further embodiment, a video capture system can be provided and configured to capture video sequences of a subject during an activity. The video capture system can include a content storage module configured to a set of frames of image data for a defined coverage area in an activity location; a content assembly module configured to determine location information identifying a plurality of locations of the subject in the coverage area and a time at which the subject was at each location and configured to select, for each location, one of the successive frames of data corresponding to the time the subject was at that location and to identify a subset of the image data in the selected frame that contains image data of the subject based on the subject location in the coverage area. The content assembly module can be provided using one or more processors, controllers, ASICs, PLAs or other componentry.

The methods, features and functionality of the invention can be implemented in hardware, software or a combination thereof. For example, a computer program product for creating a video sequence of an activity subject can be provided. The computer program product can include a computer useable medium having computer program code recorded thereon, the computer program code can include one or more instructions for causing a processing device to perform the specified functions.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for capturing content of a subject such as for example, during an event or other activity. In one embodiment, the captured content is a motion picture of a subject engaging in an activity or in the event. In an example application, a plurality of cameras are positioned at various locations about an event venue or other activity location. An activity participant can be provided with a tracking device to enable his or her position to be tracked or otherwise determined at the event venue. The tracking information can then be correlated with data gathered from the various cameras to assemble a video of the subject as he or she moved about the event venue. The video can be made available to the participant or her friends and family as a memento of the occasion.

Before describing in detail the invention, it is useful to describe a few example environments with which the invention can be implemented. One such example venue is that of a ski area. A typical ski area includes multiple trails traversing a mountainside, and can be spread out over an area of several hundred acres to several thousand acres or more. These trails can be varied and diverse, and often define physically separate and distinct skiing areas. As just one example, the Copper Mountain ski resort in Colorado is believed to have approximately 125 runs across more than 2400 acres, ranging in elevation from a base of 9,712 feet (2,960 m) to 12,313 feet (3,753 m). A typical skier enjoying a day on the slopes may ski on any number of different trails throughout the day and usually does not follow a predetermined schedule or pattern. Accordingly, it would typically be difficult to predict where the skier might be on the mountain at any given time during the day. The skier's speed and path down a given slope may also vary, making it even more difficult, if not impossible to predict the skier's path.

Figure 1:
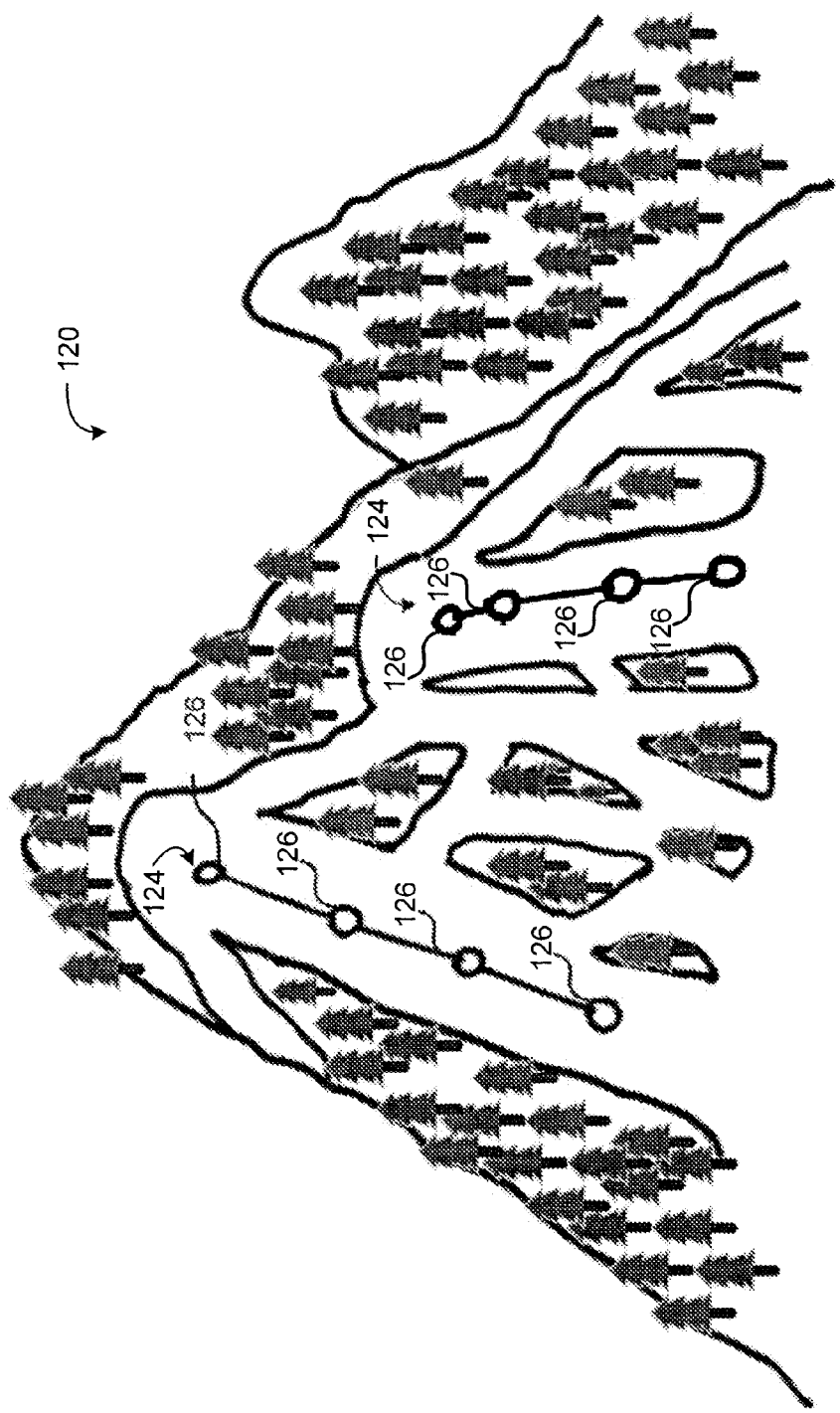
FIG. 1 is a diagram illustrating a one example of a ski area in accordance with one example environment for the invention.

FIG. 1 is a diagram illustrating a one example of a ski area in accordance with one embodiment of the invention. Referring now to FIG. 1, the example ski area 120 includes a plurality of trails traversing the side of a hill or mountain. Ski area 120 also includes one or more ski lifts 124 such as, for example, chairlifts, J-bars or T-bars, gondolas and the like. Ski lifts 124 are supported by one or more upright support members 126 as illustrated in the example of FIG. 1. Upright support members 126 might be, for example, poles or columns used to support cables that are part of the ski lift mechanism. In the illustrated example, support members 126 are disposed along one or more ski trails.

As illustrated in FIG. 1, the example ski area includes a variety of trails traversing the mountain. Skiers enjoying skiing at this ski area 120 are able to ski on any or all of these trails depending on their ability. Accordingly, to track a skier during a prolonged period of skiing could require the ability to track the skier across a large area. Although the example illustrated in FIG. 1 shows two ski lifts 124 and a particular arrangement of a plurality of trails, one of ordinary skill in the art would understand that alternative ski areas could include any of a variety of combinations of ski lifts trails and other skiing features. Additionally, the environment can span multiple ski areas or other activity areas as well.

One other example environment that will be briefly described is a racetrack, BMX track or other racecourse. These environments have some similarities to the ski slope. There is typically a large area over which the driver travels during the course of time trials, practice laps or actual races. The driver's speed around the course and, indeed at various sections of the course, may vary from lap to lap and during a given lap. Accordingly, it would likewise be difficult to predict a driver's future location at given times along the track. For BMX parks, dune areas and other like environments, the driver might not be confined to a track and trails are not necessarily well defined. This further adds to the challenge in capturing video or other content of the subjects.

As yet another example environment, consider a wildlife preserve or other wildlife habitat in which it is desired to capture video information about one or more species of wildlife. In such an environment, the participants would be the wildlife subjects that have the ability to roam about the habitat. Tracking and videographing these subjects could likewise be time-consuming, but could also be dangerous to the videographer and could disrupt the natural patterns of the species. Thus, this environment also poses challenges in capturing video of the subjects.

As still a further example environment, consider a metropolitan area that has a network of roadways about which vehicles travel. In such an environment, subjects could be, for example, vehicles, pedestrians, or other mobile objects moving about the metropolitan area. This environment likewise poses similar challenges to capturing content regarding the one or more subjects therein.

Accordingly, these described example environments provide a challenge to capturing content such as, for example motion video, of one or more activity participants. Factors such as the area spanned by the activities, variability in participant speed and location, to name a few, contribute to the difficulties associated with capturing content of the participants.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments with different subjects.

The present invention is directed toward a system and method for providing the ability to track a participant of an event or activity, and can capture the routes used during his or her performance of that activity. The present invention can also provide the ability to capture content of the participant as he or she is being tracked through the performance of the activity. For example, in one embodiment, the present invention provides the ability to capture motion images of an activity participant during the performance of the activity. Preferably, in one embodiment, the images can be captured for the participant in situations where the participant might travel over a large area during the course of performing activity.

For example, consider the example environment of the ski area as described above with reference to FIG. 1, or other like ski area. In one embodiment, the present invention can be implemented to capture motion video (with or without audio) of one or more skiers skiing down one or more trails of the ski area throughout a given time interval. In one embodiment, the one or more participants to be captured on video are provided with tracking devices to track their movement as they ski. Preferably, the tracking devices have the ability to track the user to a fair degree of accuracy as he or she skis down the plurality of trails at the ski area. As the participant skis along various trails, he or she is captured by a plurality of cameras positioned along the trails. The participant's position as captured by the tracking device is correlated with images captured by the camera such that a video of the participant skiing down the trails can be assembled. In one embodiment, timing information is used to correlate the tracked position to the correct data at the designated cameras.

Figure 2:
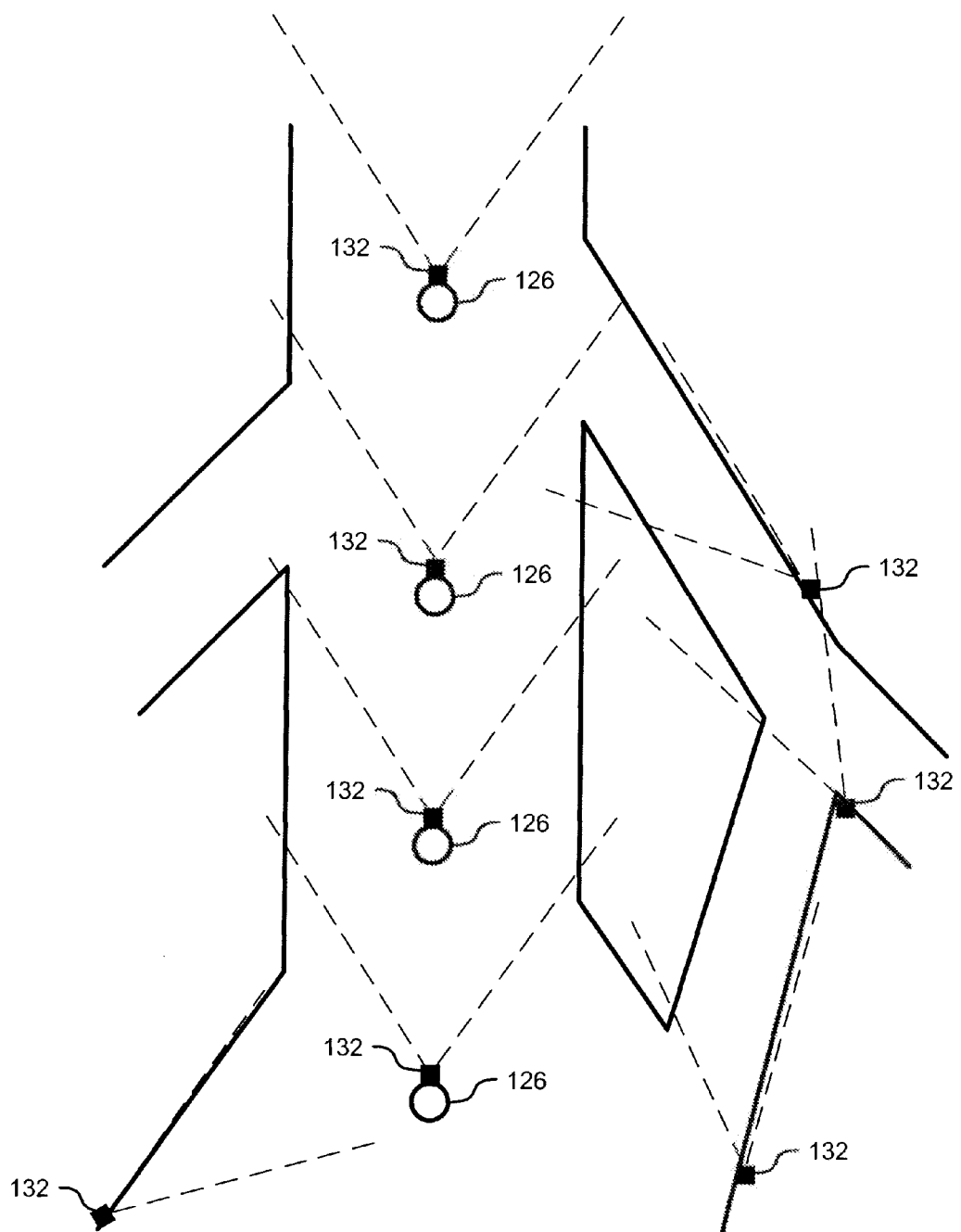
FIG. 2 is a diagram illustrating an example configuration of a plurality of cameras strategically positioned at various locations about a ski area to capture images of skiers on the trails in accordance with one embodiment of the invention.

Accordingly, in one embodiment, a plurality of cameras can be fixed at various locations of the ski area (or other environment) to capture images of the skiers as they ski down the various trails. FIG. 2 is a diagram illustrating an example configuration of a plurality of cameras strategically positioned at various locations about a ski area to capture images of skiers on the trails in accordance with one embodiment of the invention. This is a simplified example used merely to illustrate the manner in which a plurality of cameras might be positioned to cover a plurality of trails. After reading this description, one of ordinary skill in the art would understand how alternative configurations of cameras with similar or different layouts of trails can be accomplished in accordance with the principles of the invention.

Referring now to FIG. 2, in the illustrated example, a plurality of cameras 132 are illustrated as being mounted at various locations along the illustrated portions of the ski area. Some of the cameras 132 are illustrated as being mounted on ski lift poles 126. Other cameras 132 are illustrated as being mounted on structures other than the ski lift poles 126. Dashed lines are used to illustrate example fields of view of cameras 132 positioned in FIG. 2. As the example of FIG. 2 illustrates, cameras can be appropriately positioned along various portions of the ski area (or other environment) to provide suitable coverage of the area. As would be appreciated by one of ordinary skill in the art, the field of view can be selected for each camera 132 based on its mounting location and the desired area of coverage for that camera. As FIG. 2 illustrates, it may be preferable to mount the cameras 132 such that their view is in the direction of the trail rather than across the trail. Where cameras 132 are mounted viewing across or perpendicular to the direction of the trail, a skier skiing past the camera would tend to travel too quickly past the field of view, depending of course on the field of view and other parameters.

In one embodiment, cameras 132 can be mounted in fixed locations and can also be mounted in a fixed manner such that they do not physically pan or tilt or otherwise move from their designated orientation. Accordingly, in such embodiments, it may be desirable to appropriately select a field of view for each camera in accordance with its mounting location and the desired area of coverage. As discussed in further detail below, image sensors used with cameras 132 can be sized sufficiently to provide a greater coverage area. High-resolution image sensors can be chosen with a sufficient area and resolution to facilitate electronic pan, tilt and zoom operations. Image sensors chosen can be, for example, CCD, CMOS, or other image sensors as suitable based on available technology at the time.

In another embodiment, one or more cameras 132 can be mounted so that they can be repositioned for operations such as, for example, pan and tilt operations, or other operations, to allow the camera to track and identify participant during data gathering. In such an embodiment, tracking data from the participants tracking device can be gathered in real time and used to provide a feedback to a control mechanism to control the pan, tilt and zoom operations of one or more cameras 132.

In another embodiment, one or more cameras 132 can be mobile cameras moving about the ski slope attached to skiers or vehicles, each camera using its own data logging device to track its location, direction and field of view. This data can be used to calculate the geographic coverage area of each frame of video shot and all of this data further correlated with the participant's data to compile the video clips.

Figure 3:
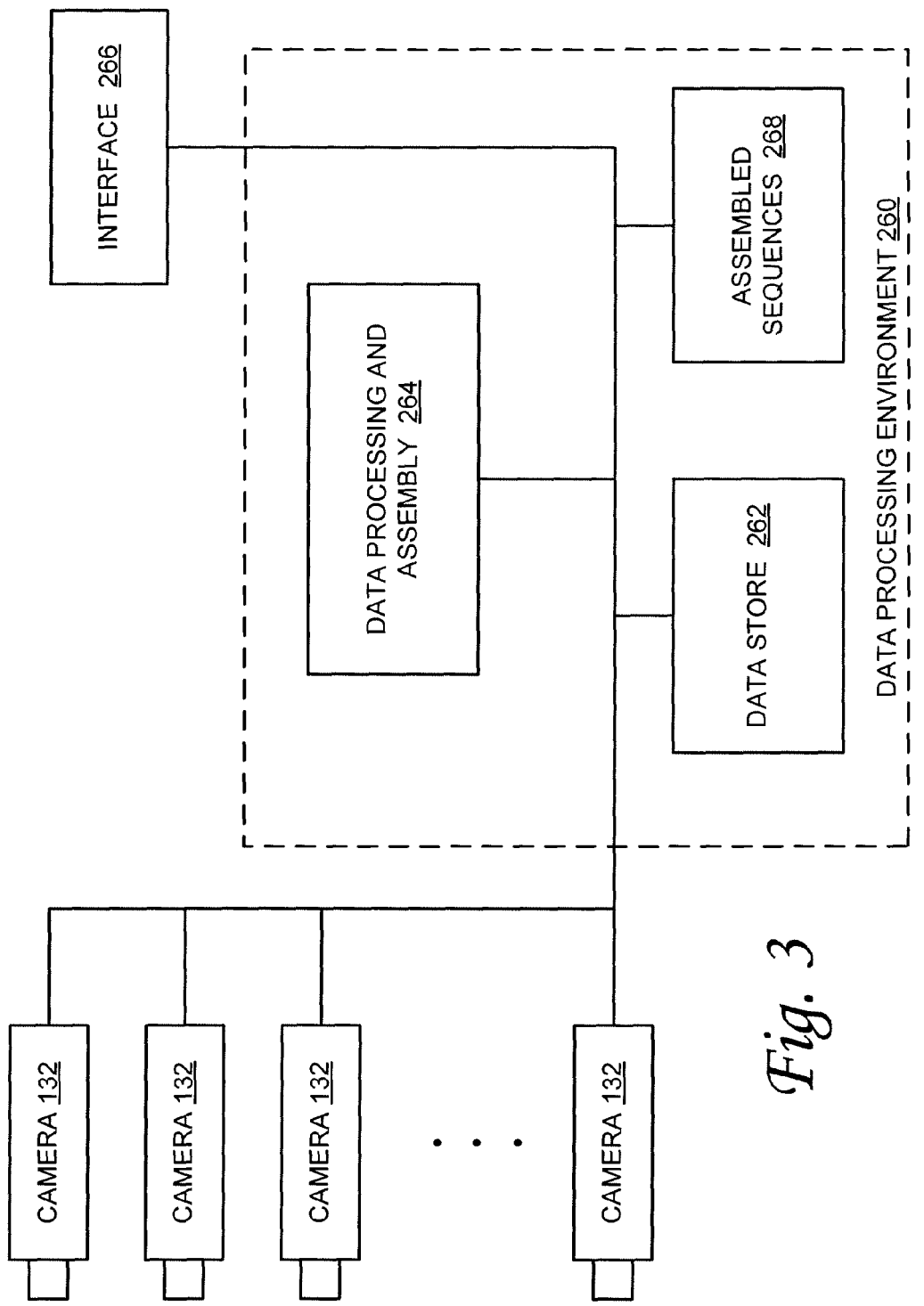
FIG. 3 is a diagram illustrating an example configuration of a data capture system in accordance with one embodiment of the invention.

FIG. 3 is a diagram illustrating an example configuration of a data capture system in accordance with one embodiment of the invention. Referring now to FIG. 3, a plurality of cameras 132 are illustrated as being communicatively coupled to a data processing environment 260. In the illustrated embodiment, data processing environment 260 includes a data store 262 and a data processing and assembly module 264. In the illustrated example, data processing environment 260 also includes a data store for assembled sequences 268 and a communications interface 266. Although data store 262 and assembled sequences 268 storage are illustrated as separate data storage units, one of ordinary skill in the art would understand that these can be combined as a single storage area appropriately partitioned. Likewise, one of ordinary skill in the art would understand that other physical or logical partitioning of the data storage areas can be implemented.

In one embodiment, one or more cameras 132 can be configured to stream their data in real-time to the data processing environment 260. In another embodiment, the data can be downloaded in batches at periodic or other intervals rather than streamed in real-time. As described above, a plurality of cameras 132 are positioned at various locations throughout the environment. Image data such as, for example, data captured via a CCD CMOS or other image sensor, can be sent to data processing environment 260 via a wired or wireless communication link. The data sent to data processing environment 260 can include identification information indicating from which camera 132 the data was received.

The data can also be time stamped either by cameras 132 or data processing environment 260 such that the data can later be correlated with tracking information for given time periods. In one embodiment, segments or other subsets of the data can be time stamped such that the segments can be retrieved based on camera identification and time-stamp information. Frame-by-frame time stamping could consume relatively large amounts of storage space. Accordingly, a time-stamped segment could comprise a single frame of data but preferably would comprise a plurality of frames captured at or near the marked time. The resolution of the time stamping can be chosen based on a number of factors including, for example, resolution of the timing system, geographic coverage area of a frame, anticipated rate of travel of the subject through a frame coverage area, and so on. Of course, if digital pan, tilt or zoom operations are used, a higher timing resolution might be desirable depending on the goals of the design.

In another embodiment, an indirect time-stamp approach can be implemented. For example, in one approach one or more epochs can be time stamped such as, for example, the start of a recording event or periodic recording intervals. In such an embodiment, desired segments (frames or groups of frames) can be identified based on elapsed time from the noted epoch. For example, based on the frame rate, a desired video segment captured at a given time might be located based on the number of frames elapsed after the epoch event. Accordingly, each segment is not necessarily time stamped individually, but an epoch time stamp can be used in conjunction with other temporal computations to locate the desired image data corresponding with a given location and a given time.

As described in further detail below, image sensors used with one or more cameras 132 may be relatively large area, high-resolution image sensors that are partitioned into multiple sectors. Accordingly, partition information can also be provided with the data captured and sent to data processing environment 260 such that captured data associated with a particular partition can be identified. This can be used to support digital pan, tilt and zoom operations.

In a similar vein, the data received from cameras 132 can include x-y or other like information identifying the area of the image sensor to which the data corresponds. Accordingly, with a high enough resolution and a large enough area of the image sensor, this x-y data used to support another embodiment of electronic or digital pan, tilt and zoom operations allowing data to be used from only selected areas of the image sensor for given time intervals.

Data store 262 can be configured to store data from cameras 132 along with other information such as, for example, camera identification information, image sector identification information, timestamp or epoch information, or other information that might be useful for assembling content sequences for various participants. Data can be batched to data store 262 or sent in real-time from cameras 132. Timestamp information can be generated at cameras 132 and combined with the data as it is created or alternatively, timestamp information can be generated at data processing environment 260 and combined with the data as it is received and stored. Examples of how data can be formatted for storage and data store 262 are described in further detail below.

Also illustrated in the example architecture of FIG. 3 is a data store for assembled sequences 268. This data store can be used to store assembled sequences of video data from a plurality of cameras 132. For example, in an operation of assembling a video sequence for a designated participant, data processing and assembly 264 gathers the appropriate video sequences based on the tracking and timestamp information and concatenates the sequences together into a series of assembled sequences to create the participant's video. These assembled sequences can be stored (such as, for example, in the data store for assembled sequences 268) such that they can be available to provide to the participant or other requester. In another embodiment, rather than concatenating the sequences into a complete video sequence, the data items are labeled and stored to facilitate a more custom assembly by a user.

Data processing and assembly module 264 can be included as shown in the example illustrated in FIG. 3. Data processing and assembly module 264 can be used to assemble video sequences from a plurality of cameras 132 to create an assembled sequence for user. For example, consider a simple scenario where a skier wishes to purchase a video of himself skiing down the slopes. In such a scenario, the user is given a tracking device to carry with him while he is skiing. Data processing and assembly module 264 receives the tracking data from the tracking device. For example, this could be accomplished by interface 266 in real time or at the end of the skiing session. Data processing and assembly module 264 evaluates the tracking data to determine where the skier was during various times of the skiing session. Data processing and assembly module 264 correlates the time-stamped tracking information with various video sequences received from the cameras 132 positioned about the ski area. Data processing and assembly module 264 retrieves the video sequences corresponding to the appropriate cameras for the appropriate times to gather sequences of video that contain shots of the designated participant. In embodiments where digital pan, tilt or zoom features are included, data processing and assembly module 264 can use the tracking information to further identify the appropriate sector of a given cameras' image sensor (or other pixel range) corresponding to the tracking information.

Interface 266 can be used to provide a communications interface to receive tracking data from one or more participants being tracked. Interface 266 can also provide a communication interface to download or otherwise provide assembled content (i.e., motion video in the example environment) to the participant or other user of the system. Accordingly, interface 266 can include the appropriate wired or wireless communication interfaces to accommodate the desired features and functionality. For example, a wired or wireless interface can be provided to receive tracking data from the various tracking devices used by the participants. In one embodiment, such tracking data can be received by the system in real-time as the skiers are skiing along the slopes. Accordingly, in such an embodiment, such an interface would preferably be a wireless interface capable of receiving real-time tracking data for each user.

In another embodiment, tracking data can be received in a batch mode after tracking data has been gathered for a participant. For example, after a morning of skiing (or a day of skiing, or other time.), the participant can cause his or her tracking data to be downloaded to data processing system 260. Accordingly, a wired or wireless interface can be provided to allow the tracking device to download the data in a batch mode. Preferably, data downloaded in the batch mode includes timestamp information to allow the participant's tracking information to be correlated with time. In other words, the epoch data can be used to identify, along with the tracking data, where the participant was at a given time of day.

This information can be used to select the appropriate camera corresponding to the coverage area in which the participant was skiing at a given time. Furthermore, the data received for each participant would include an identification that can be used to identify the tracking information with the particular participant. Such information can be later used when assembling motion video sequences for the participants.

Figure 4:
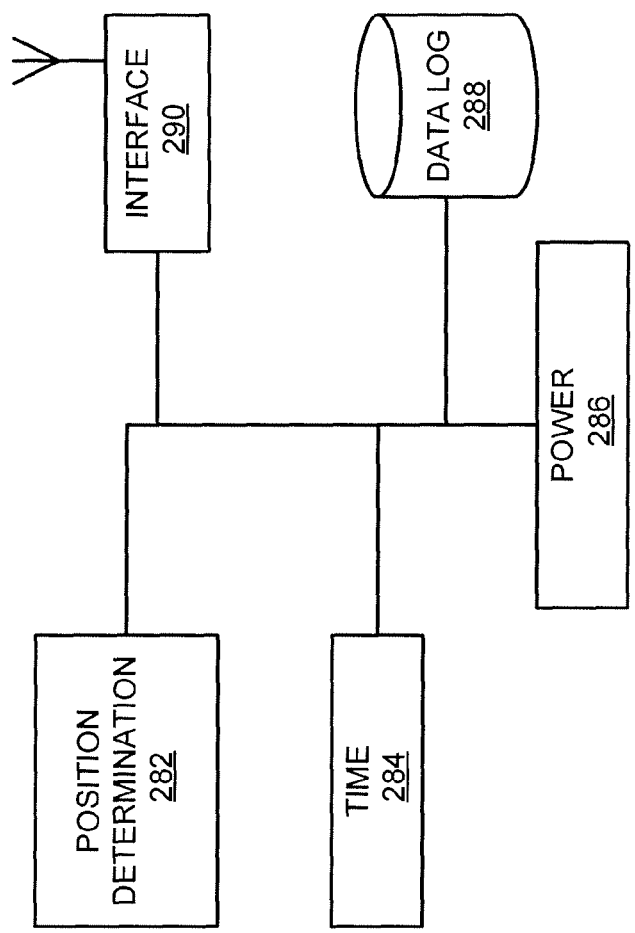
FIG. 4 is a diagram illustrating an example architecture that can be used for a tracking device in accordance with one embodiment of the invention.

FIG. 4 is a diagram illustrating an example architecture that can be used for a tracking device in accordance with one embodiment of the invention. Referring now to FIG. 4, the example architecture illustrated includes a position determination module 282, a timestamp module 284, a data storage module 288, a wired or wireless interface 290, and a power source 286. Because the tracking device is carried by the participant performing the activity, it is preferred that the tracking device be small and light weight. It is also preferred, for the same reason, that the power source 286 be configured to be able to power the tracking device for the duration of the intended session. Accordingly, in one embodiment, the power source 286 is a rechargeable battery source such as, for example, a lithium ion battery. However, any of a number of alternative power sources can be provided.

Position determination module 282 can be implemented using any of a variety of position determination technologies. For example, in one embodiment, GPS technology can be used to perform the position determination for the tracking device. Although not illustrated, a GPS antenna can be provided to receive the appropriate satellite signals from the GPS constellation. A GPS receiver and processing module can be used to decode the satellite timing signals and compute the tracking device position based on those signals.

As another example, various forms of RF or other wireless triangulation techniques can be used to perform the position determination. For example, a plurality of transmitters can be positioned at various locations about the activity area. Position determination module 282 could include a receiver to receive wireless signals from the various transmitters as well as a processing module to process the received signals from the transmitters at known locations to thereby triangulate the position of the tracking device.

As still another example, RFID transponders can be positioned at various locations about the activity area. The tracking device can include an RFID communication unit that can communicate a signal to a transponder when in proximity to that transponder, thereby indicating the position of the tracking device. The RFID communication unit can include identification of the tracking device such that a plurality of tracking devices can be used with the RFID transponders.

In embodiments where GPS or other like technology is utilized, location information is generated at the tracking device and therefore preferably stored locally at the tracking device such as, for example, in a data log 288. In this manner, the tracking data can be saved as it is generated and downloaded either in real time or in batch mode such as, for example, via interface 290.

The example depicted in FIG. 4 is illustrated as including a timestamp module 284 to gather timing information during tracking activities. For example, a real-time clock synchronized with the rest of the system can be used to keep track of time as location is being tracked. Accordingly, position data stored in data log 288 or transmitted in real-time to the central server can be tagged with the appropriate timestamp information. As a result of this feature, the system can be used to determine where the participant was at a given time during the tracking activities. This can be later used when correlating tracking information with camera information to select not only the correct camera or camera sector (based on tracking information) but also to determine which data for a given time period from that camera or sector should be utilized.

Although not separately illustrated, a controller can be included to control the operations of the tracking device and to assemble the position and time information appropriately as well as to store this assembled information in data log 288. A dedicated controller can be provided to perform the specified functions or a shared controller can be utilized to control the operations of position determination and time stamping as well. As discussed above with respect to image data, tracking data timing information can be derived directly or indirectly. For example, in one embodiment, segments of tracking data can be individually time stamped to provide a direct indication of the time at which a participant was positioned at a given location. Alternatively, in another embodiment, epochs can be time stamped such as, for example, the beginning of the activity. From this known time, location information corresponding to a given point in time can be located. Accordingly, as with the video data each item of tracking data is not necessarily time stamped individually, but an epoch time stamp can be used in conjunction with other temporal computations to locate the desired tracking data corresponding to a given time.

As discussed, interface 290 can be a wired or wireless interface and can be primarily configured to transfer tracking data from the tracking device to the server. In one embodiment, a longer-range wireless interface can be provided to allow real-time tracking data to be downloaded to the system as the participant travels across the activity area. Depending on the size of the area covered in the duration of the activity, a real-time wireless interface may be undesirable due to power and range considerations. Accordingly, in another embodiment, the tracking device is configured to store the tracking information and download it in a batch mode to the server at the end of the activity or at periodic intervals. For example, at the end of the activity session the participant can return the tracking device and communication can be initiated between the tracking device and the data processing environment 260. In other words, interface 290 can communicate with interface 266 to transfer the tracking and timestamp information for processing by data processing and assembly module 264. In environments where the data is stored with the tracking device and later downloaded in a batch mode, it is preferred that timestamp information be stored with the data such that it can be appropriately correlated as described above. In embodiments where data is transmitted in real time to the data processing environment, it may be preferable to have the data processing environment perform the time measurement and timestamp operations to thereby reduce the load on the tracking device and thus its power consumption.

As described above, in one embodiment, operations such as pan, tilt and zoom may be performed electronically or digitally without having to change camera position. Accordingly, one or more of the various cameras 132 can be in a fixed location with a fixed orientation and fixed focus and zoom parameters. As also described above, the geographic coverage area of the various cameras 132 can be known data element and can be fixed in advance. Therefore, the tracking information can be used to track the participant's movement through the coverage area of a given camera. In one embodiment the tracking data can then be used to not only identify which camera 132 of a plurality of cameras 132 contains image data of the participants, but also which portion of the camera's image sensor contains data of the participant.

Figure 5:
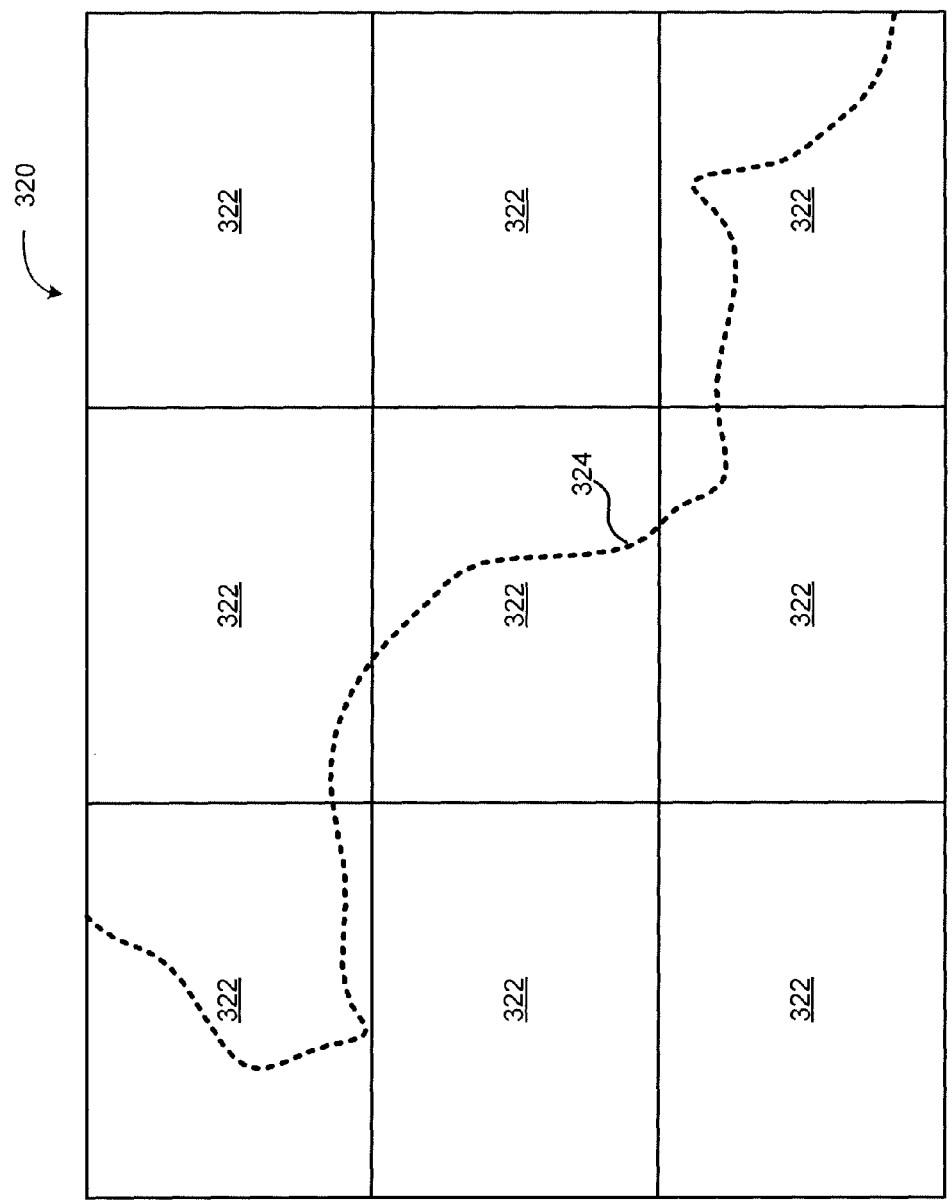
FIG. 5 is a diagram illustrating an example of an image sensor divided into a plurality of sectors in accordance with one embodiment of the invention.

FIG. 5 is a diagram illustrating an example of an image sensor divided into a plurality of sectors in accordance with one embodiment of the invention. Referring now to FIG. 5, in the illustrated example a sensor 320 is shown as being divided into nine segments 322. In the illustrated example, the segments comprise subsets of pixels, and the resultant pixel data that are defined subsets of the entire frame. In one embodiment, the subsets or segments 322 can be defined by two-dimensional pixel-coordinate ranges or other definitional parameters.

Also in the illustrated example, segments 322 are approximately equal in dimension to one another. Accordingly, in this example, each segment 322 contains approximately the same number of pixels configured in approximately the same aspect ratio. In alternative embodiments, segments 322 can be of various dimensions depending on the application and the features of the coverage area. Preferably, the aspect ratio of each sector 322 conforms to the aspect ratio of the final assembled sequence. In one embodiment, the aspect ratio of each sector 322 is the same as the aspect ratio of full image sensor 320. Accordingly, in one embodiment, the sensor 320 is divided into an equal number of rows and columns.

Also illustrated in FIG. 5 is a path 324 of the subject to be recorded. For example, in accordance with the example environment, path 324 can represent the path taken by the skier cross the geographic coverage area covered by image sensor 320. In the illustrated example, the skier in this pass across the area covered by image sensor 320 actually traversed areas covered by five of the nine sectors 322. In embodiments where an image sensor is divided (electronically or otherwise) into a plurality of sectors 322, the data assembled into the final sequence can be used as full frame data or as data from a set of one or more sectors 322. In one embodiment, the system can be configured to automatically assemble the video sequences on a sector-by-sector basis. That is, in this embodiment, when the tracking information is used to select video data for assembly, where only one sector 322 in which the participant is covered is selected. Thus, the plurality of successive sectors 322 can be strung together to create the assembled video sequence.

Transitions between sectors can be accomplished similar to transitions between cameras. For example, the assembled video can simply switch from sector to sector to sector much in the way that a normal video production switches from camera to camera. Fades, wipes or other transition effects can be added to enhance the finished product.

Figure 6:
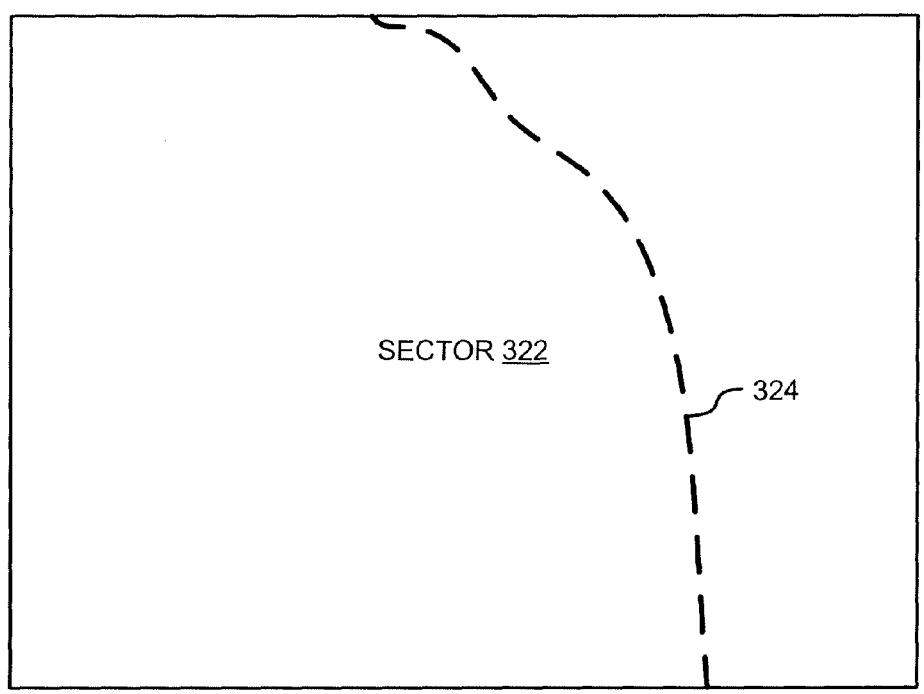
FIG. 6 is a diagram illustrating an example of frame data from one of a plurality of sectors selected in accordance with one embodiment of the invention.

FIG. 6 is a diagram illustrating an example of frame data from one of a plurality of sectors 322 selected in accordance with one embodiment of the invention. Referring now to FIG. 6, the illustrated sector 322 is center sector 322 in FIG. 5. FIG. 6 illustrates, accordingly, the video sequence that would be provided when this sector is selected for assembly into the final assembly sequence.

In another embodiment, rather than dividing image sensor 320 into a group of sectors, the subject can be "followed" across the image sensor. For example, in one embodiment a subset of pixels can be selected as an area of pixels around the position of the subject as he, she or it traverses the area covered by the image sensor. Additionally, as the subject moves, the area of pixels moves with the subject. For example, a window 332 of pixels can be defined in the frame selected such that the subject is approximately centered in the window 332. In one embodiment, window 332 can be chosen as having a predefined aspect ratio. For clarity of illustration, only one of windows 332 includes the reference number on the figure. As the subject moves across the geography covered by image sensor 320 the window 332 moves as well thereby keeping the subject in the frame of selected data. Accordingly, in one embodiment, x-y or other locational pixel information can be used when retrieving video information corresponding to the tracking data.

Figure 7:
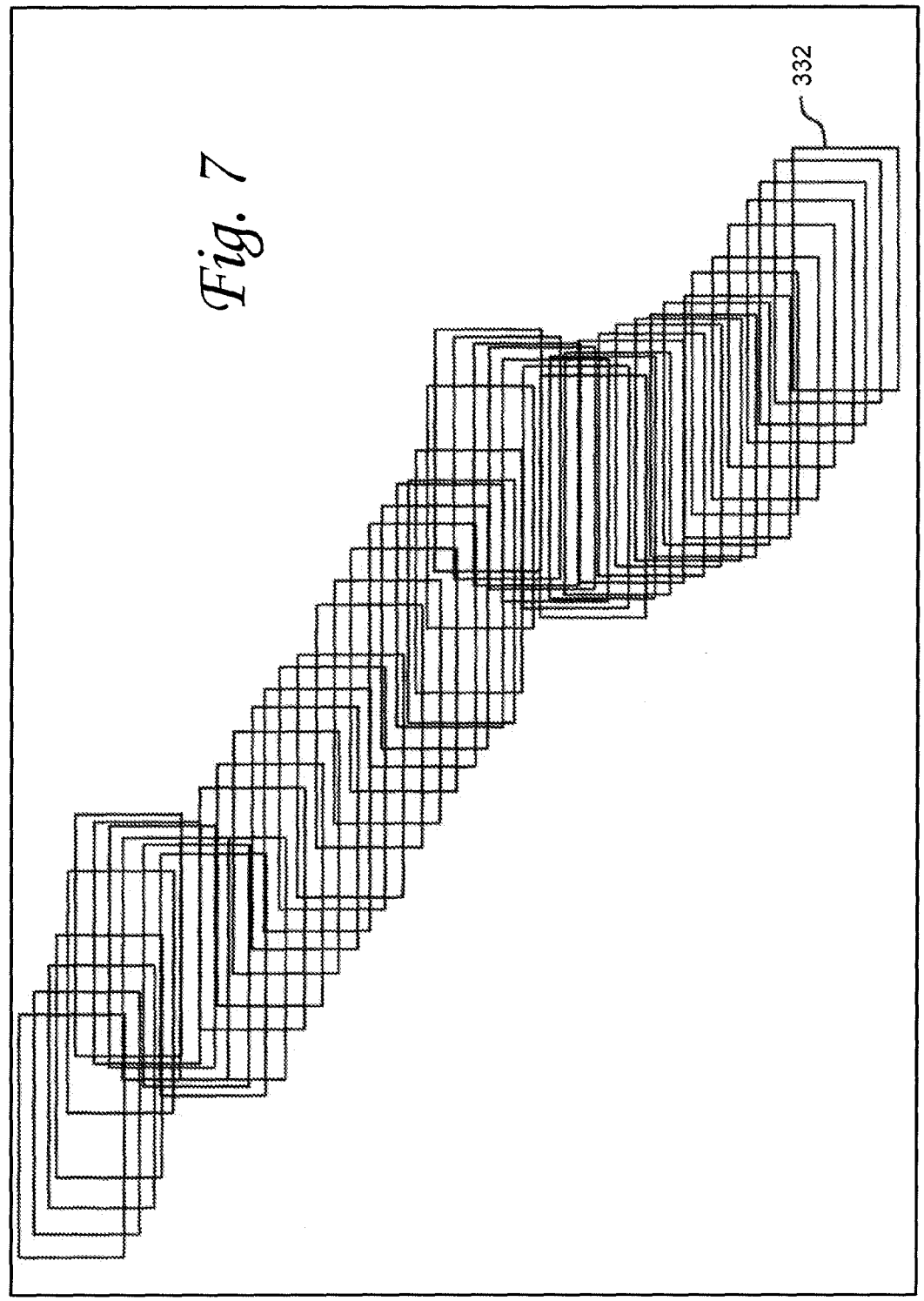
FIG. 7 is a diagram illustrating an example of a plurality of successive windows defined across image sensor corresponding to the location of the track subject in the area of coverage.

FIG. 7 is a diagram illustrating an example of a plurality of successive windows 332 defined across image sensor 320 corresponding to the location of the subject in the area of coverage. The windows 332 preferably conform to the final aspect ratio of the assembled sequence so that they do not introduce an undue amount of distortion. In one embodiment, the subsets 332 can be defined by two-dimensional pixel-coordinate ranges or other definitional parameters. Additionally, windows of other shapes can be provided. In another embodiment, window sizing can be configured to change depending on a plurality of factors such as, for example, number of subjects in the frame, proximity of the subjects to one another, proximity of the subject to the camera and so on. For example, as the subject moves closer to the camera, with a fixed optical focal length, the subject would tend to occupy more of the frame. Accordingly, the subset 322 would be selected to cover a larger image sensor area as the subject moves closer. Knowledge regarding the size of the subject, focal length of the system, position of the subject and the like can be used to facilitate the calculation.

The above described and other like embodiments can be implemented so as to have the effect of providing an electronic or digital pan, tilt or zoom features for capturing content relating to the subjects. For example, selecting a subset of pixels and using those to display the full frame image can have the effect of zooming in on the selected area. Similarly, following the subject by moving or changing the selected subset as the subject moves can have the same effect as pan and tilt operations with a camera having a smaller field of view. As one of ordinary skill in the art would appreciate after reading this description, if the higher the resolution of the image sensor, the higher the resolution will be of a given subset of pixel data. Accordingly, a higher resolution image sensor would tend to allow selection of a smaller area of the image sensor as a subset while maintaining a given level of quality, with other factors being equal.

In one embodiment, the selected window size can be changed to further effectively zoom in on or zoom out from the subject. For example, as data is retrieved from the data store, the number of pixels or pixel area can be defined to provide the desired zoom level. Bi-linear interpolation or other like techniques can be utilized to further enhance this feature. Pixel pitch and image sensor resolution are parameters to consider when determining a maximum zoom capability.

Figure 8:
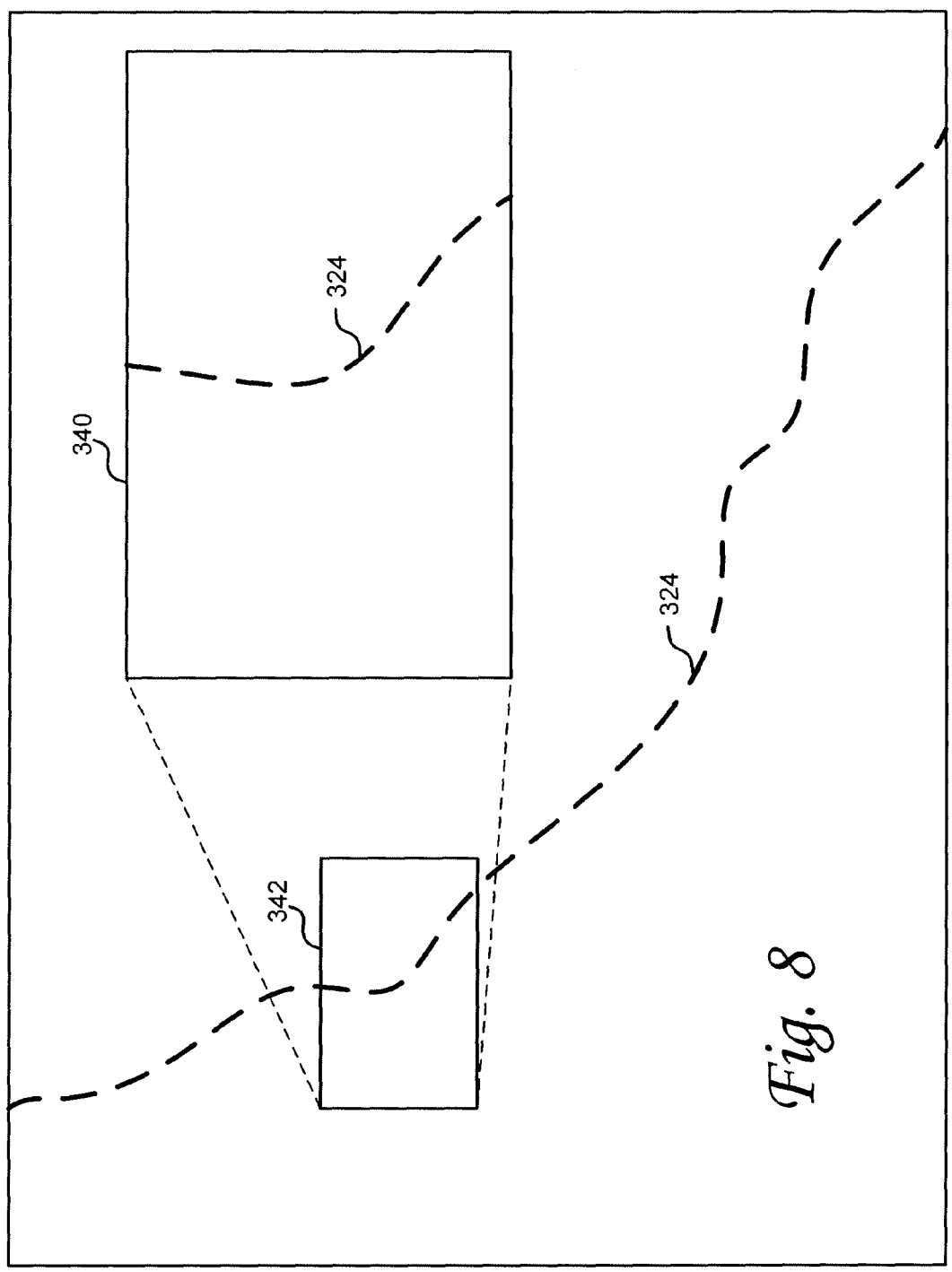
FIG. 8 is a diagram illustrating one example of including a picture-in-picture window in accordance with one embodiment of the invention.

In another embodiment, enhanced features such as picture-in-picture video sequences can be created. To illustrate by way of example, consider the sector-divided image sensor 320 illustrated with respect to FIG. 5. In this example, consider a scenario wherein the full frame image sensor (or other set of sectors 322) is provided as the background and a single sector 322 is provided as a pop-up window overlaying the background window to provide a zoomed-in insert. FIG. 8 is a diagram illustrating one example of including a picture-in-picture window in accordance with one embodiment of the invention. Referring now to FIG. 8, illustrated as the background window is image sensor 320 with the track 324 illustrating the path of the subject moving through the visible area of the image sensor. Also illustrated in FIG. 8 is the overlay window 340 used to provide the picture-in-picture feature. In the illustrated example, overlay window provides the video sequence for one area of image sensor 320. Particularly, in this example, the selected area is highlighted by rectangle 342. A zoomed-in image of area 342 is shown as an overlay 340 while the participant is skiing in that area. In one embodiment, the invention can be configured such that the sector displayed in pop-up window 340 changes from sector to sector as the participant transitions from sector to sector, or moves somewhat more continuously as the participant moves from area to area across the sensor.

In one embodiment, a user can be given control in the assembly process such that factors such as zoom level, sector selection, sector transition, camera transitions, background music clips, picture-in-picture features and other aspects for the assembled sequence can be chosen and manipulated. Accordingly, in one embodiment, the user can be provided with flexibility in assembling the assembled video sequence.

Figure 9:
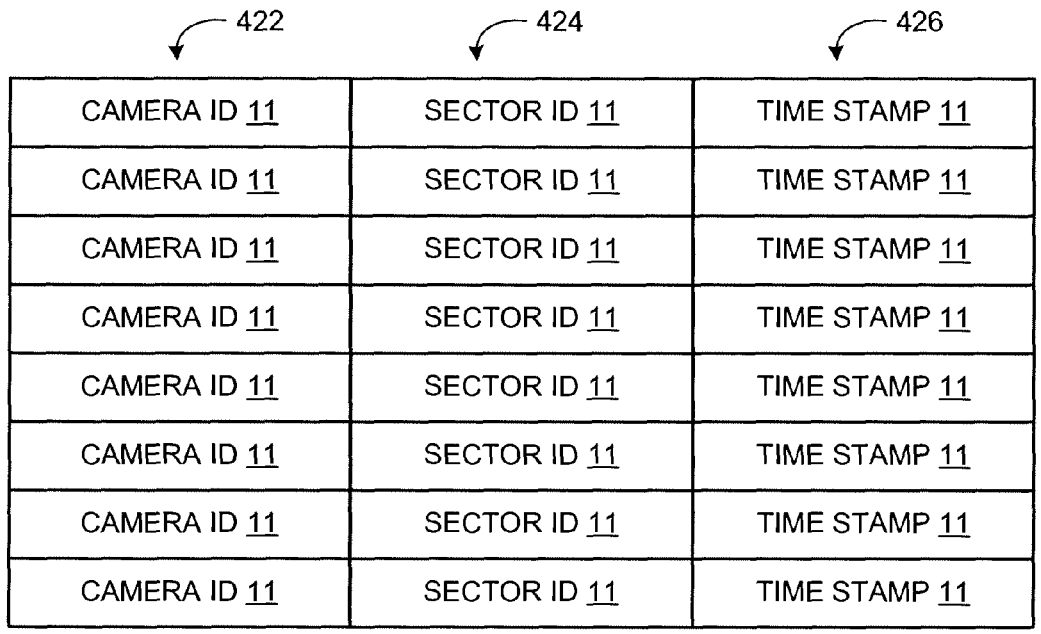
FIG. 9 is a diagram illustrating one example of a data format for image data in accordance with one embodiment of the invention.

FIG. 9 is a diagram illustrating one example of a data format for image data in accordance with one embodiment of the invention. In the example illustrated in FIG. 9, the data that is stored is stored with tags for its associated camera ID 422, a sector ID 424 and a timestamp 426. Thus, in this illustrated example, the data that is clocked out for each sector is tagged with this information.

Figure 10:
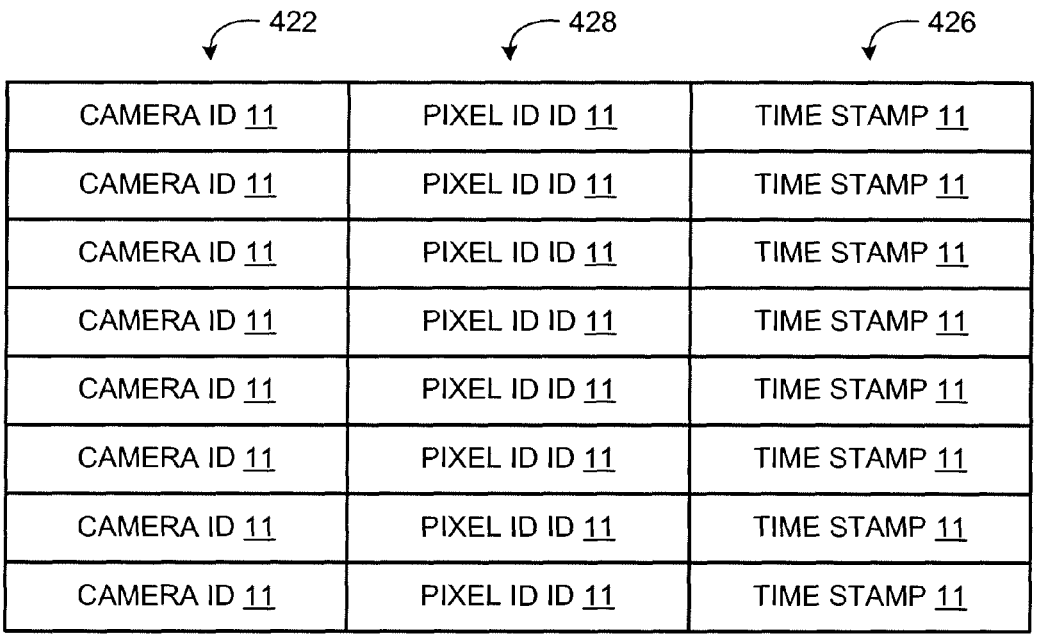
FIG. 10 is a diagram illustrating another example of a data format for image data tags in accordance with one embodiment of the invention.

FIG. 10 is a diagram illustrating another example of a data format for image data tags in accordance with one embodiment of the invention. Referring now to FIG. 10, in this example the data that is stored is stored with tags for camera ID 422 and a timestamp 426 as illustrated above in the example of FIG. 9. However, in this example, instead of a sector ID 424 there is a pixel ID 428. Pixel ID 428 can, for example, be used to define a range of pixels for which the data is stored. Accordingly, predefined areas of the image sensor can be stored and their pixel range is tagged to identify that data. Alternatively, the data can be stored on a pixel-by-pixel basis such that the data can be resolved to a desired level. As one of ordinary skill in the art will appreciate, where data is stored on a pixel-by-pixel basis, it is not necessary to store a pixel ID for each pixel. Instead, beginning or end flags can be used to store a set of pixel data and counter or addressing schemes can be used to locate a desired pixel or range of pixels.

Figure 11:
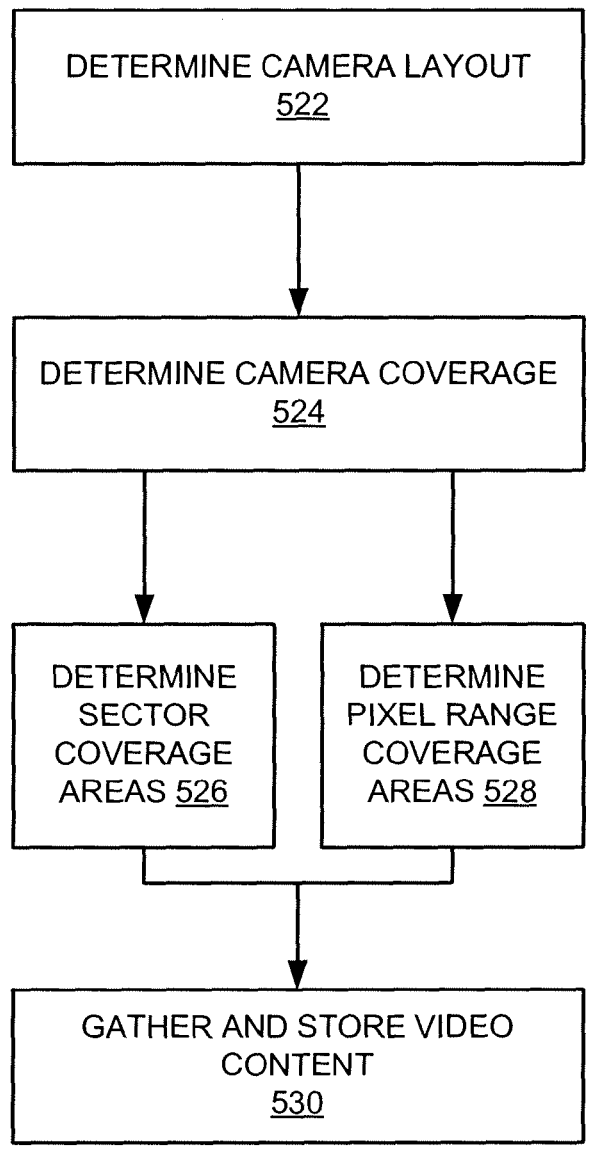
FIG. 11 is a diagram illustrating a high-level flow for gathering tracking information and capturing content in accordance with one embodiment of the invention.

FIG. 11 is a diagram illustrating a high-level flow for gathering tracking information and content in accordance with one embodiment of the invention. Referring now to FIG. 11, in a step 522 a camera layout is determined to accomplish the desired coverage and cameras can then be appropriately positioned. For example, in terms of the ski slope environment, a plurality of cameras 132 are positioned at appropriate locations throughout the ski area to be able to capture motion picture data over desired areas of the ski slope.

In a step 524 the geographic area of coverage is determined and defined for each camera 132 that is installed. This information can then later be used to correlate tracking information with camera information to identify the cameras captured and identified participant or participants skiing in a given coverage area. The coverage area can be identified, for example, by latitude and longitude boundaries such that this data can be correlated with GPS or other like tracking data. As another example, in embodiments where RFID or other like communication devices are used to track participant location, the geographic coverage areas can be defined by transponder locations.

As noted above, in some embodiments camera image sensors can be divided into sectors each having a given coverage area. Accordingly, in one embodiment, at 526 the geographic areas of coverage for the sectors of each of the cameras can also be identified and stored. Techniques used to identify and store sector area coverage information can be similar to those described above with respect to identification and storage of geographic coverage information for cameras. In an alternative embodiment in step 528, sectors can be mapped with geographic areas. For example, pixels or pixel ranges can be correlated with the geographic area to which they correspond. This can later be used to facilitate digital pan, tilt and zoom operations. With the cameras and image sensor subsets identified a mapped, the system is ready to gather and store video information from the plurality of cameras as illustrated by step 530.

Figure 12:
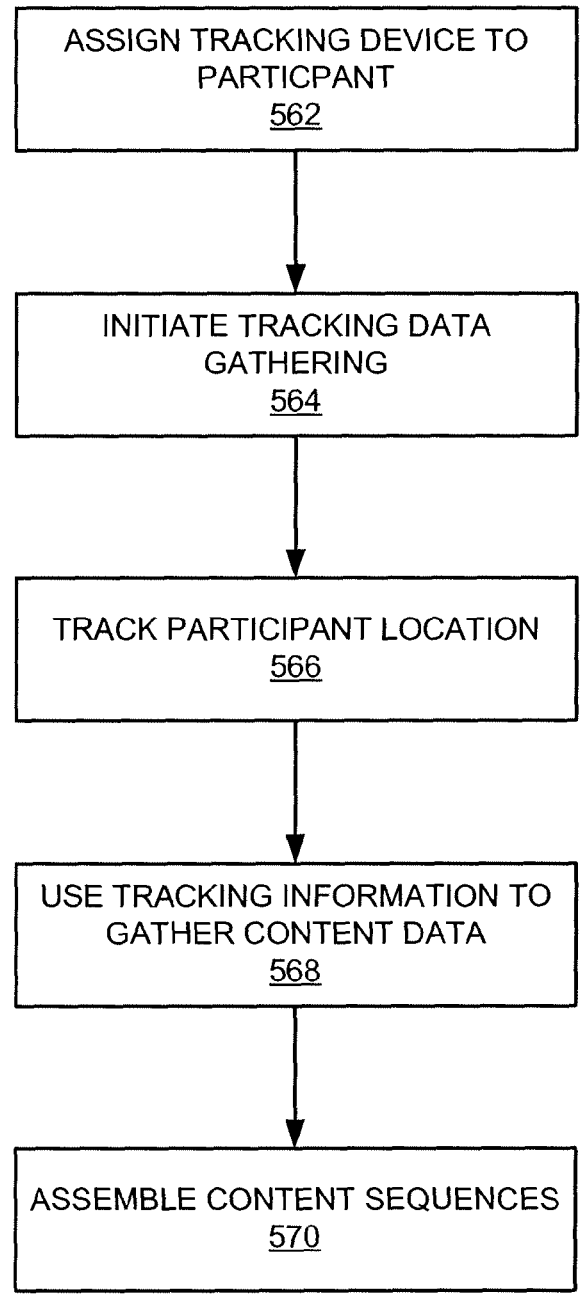
FIG. 12 is an operational flow diagram illustrating an example process for tracking a participant in gathering data in accordance with one embodiment of the invention.

FIG. 12 is an operational flow diagram illustrating an example process for tracking a participant and gathering data in accordance with one embodiment of the invention. Referring now to FIG. 12, in a step 562 a tracking device is assigned to a participant. For example, a tracking device such as those described in various embodiments herein can be provided to the participant to wear on his or her clothing or otherwise carry it along throughout the activity. Preferably, the tracking devices have a serial number or other means of identification such that a particular tracking device can be associated with a particular participant.

In a step 564, the data gathering process is initiated with the tracking device. As described above, and various embodiments as the participant travels about the environment area the tracking device gathers tracking data as well as timing information to enable determination of where the user was in the area at a given time. As also described, in another embodiment, a tracking device communicates with transponders located throughout the area such that participant location can be tracked during activity participation. The operation of tracking participant location using the tracking device is illustrated by a step 566.

In a step 568, the tracking data is read and used to gather video information corresponding to the times and locations identified by the tracking data. In a step 570, the gathered video information is assembled into a completed video of the participant.

Figure 13:
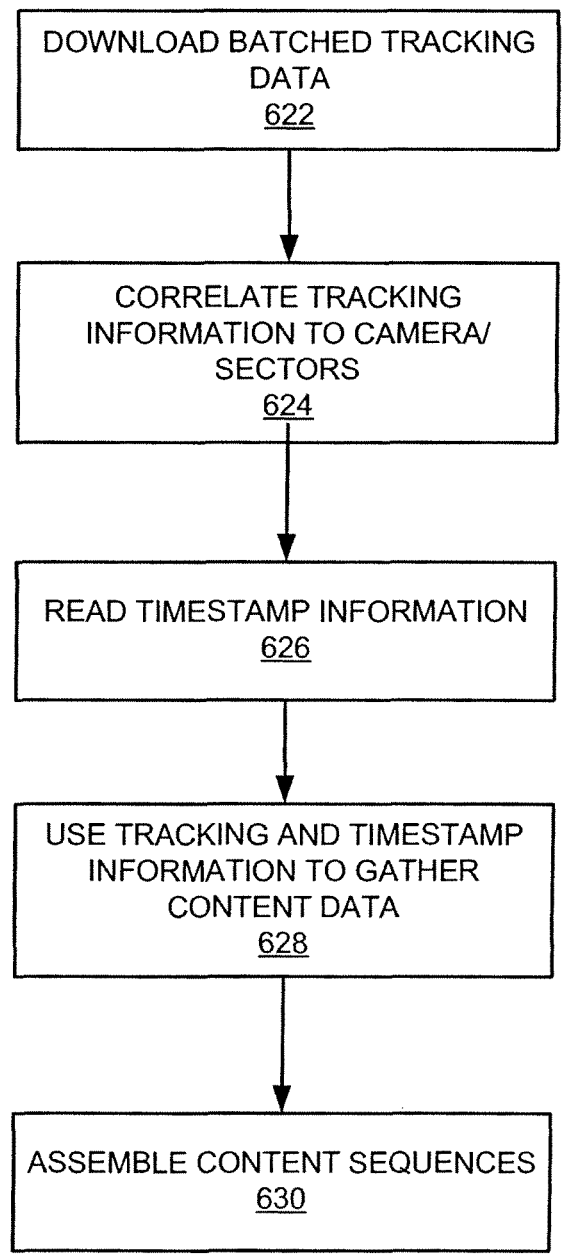
FIG. 13 is an operational flow diagram illustrating a process for assembling content information using a batch mode in accordance with one embodiment of the invention.

As stated above, tracking information can be sent to the server in real time or by one or more batches in a batch mode. FIG. 13 is an operational flow diagram illustrating a process for assembling content information using a batch mode in accordance with one embodiment of the invention. Referring now to FIG. 13, in a step 622 a batch of location data is downloaded to the data assembly server. In this embodiment, the downloaded data includes tracking or location information for the participant as well as timestamp information for the reported locations. As already stated, this enables the determination of where a participant was at which times during the activity. The location information is retrieved preferably on a serial basis.

In a step 624, as the location information is retrieved it is correlated with geographic data on the cameras to determine which camera has data corresponding to the participant's location. In a step 626, the time stamp information for a given set of location data is read. The camera and time stamp information can then be used to retrieve data corresponding to the proper participant location at that time. This is illustrated by a step 628. At a step 630, the retrieved video data is appended to the previous data to assemble a video sequence as illustrated by step 630. This process can continue for any or all of the tracking data in the tracking device.

Figure 14:
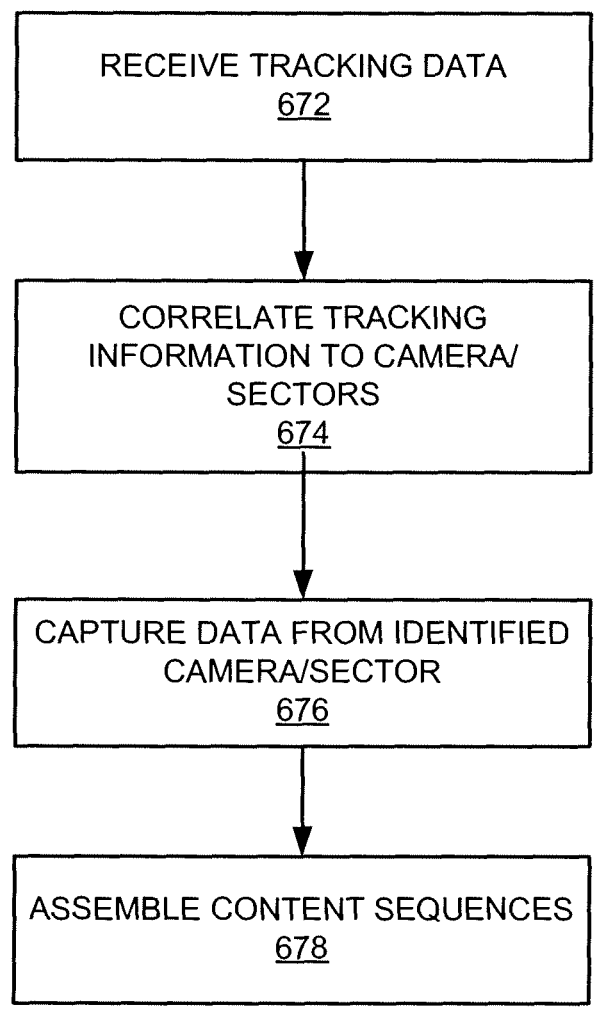
FIG. 14 is a diagram illustrating an example process for assembling content information in real time in accordance with one embodiment of the invention.

FIG. 14 is a diagram illustrating an example process for assembling content information in real time in accordance with one embodiment of the invention. Referring now to FIG. 14, in a step 672, tracking data is received from the tracking unit for a given participant. For example, tracking data can be GPS for other position information sent wirelessly to the server in real time, as the participant is engaging in an activity. As another example, the tracking data can be generated based on tracking device communications with various transponders positioned about the activity area.

In a step 674, the location information is determined and this location information is used to identify camera corresponding to that geographic area. At step 676, the data from that camera is captured. Of course, in embodiments where sectors or digital zoom are used, sector or pixel range information can also be used to identify appropriate camera data for inclusion in the video sequence. In a step 678, the video clips are assembled into complete video assembly.

The final video can be created and delivered to the participant or other user according to a number of different mechanisms. In one embodiment, content selection and assembly occurs automatically upon receipt of tracking data. That is, in one embodiment, the tracking data is used to retrieve corresponding video information and video information assembled into the final motion video. In alternative embodiments however, the ability for user to produce a more custom content package can be provided. For example, in one embodiment, the user can be provided with an editing application that allows the user to select whether to keep or discard various sections of video footage. An editing application can also be configured to allow a user to manually control pan, tilt and zoom operations as well as transitions from camera to camera or sector to sector. As a further example, in this embodiment, the user might be provided with all of the raw data from the various cameras at which it was captured. The user can then manipulate the data and control framing, zooming, and other aspects of the data by selecting subsets of the entire data package for inclusion in the final assembly sequence. Thus, a user can personalize the content in accordance with his or her preferences.

In one embodiment, the assembled video or the raw data can be provided to the participant at the activity location. In another embodiment, the user can log into the system (for example via the Internet or other communication medium) to access the data and assemble a video or play a previously assembled video. Accordingly, with a web-based or other remote access means, users can be given the opportunity to create or customize their content after they have completed the activity.

Figure 15:
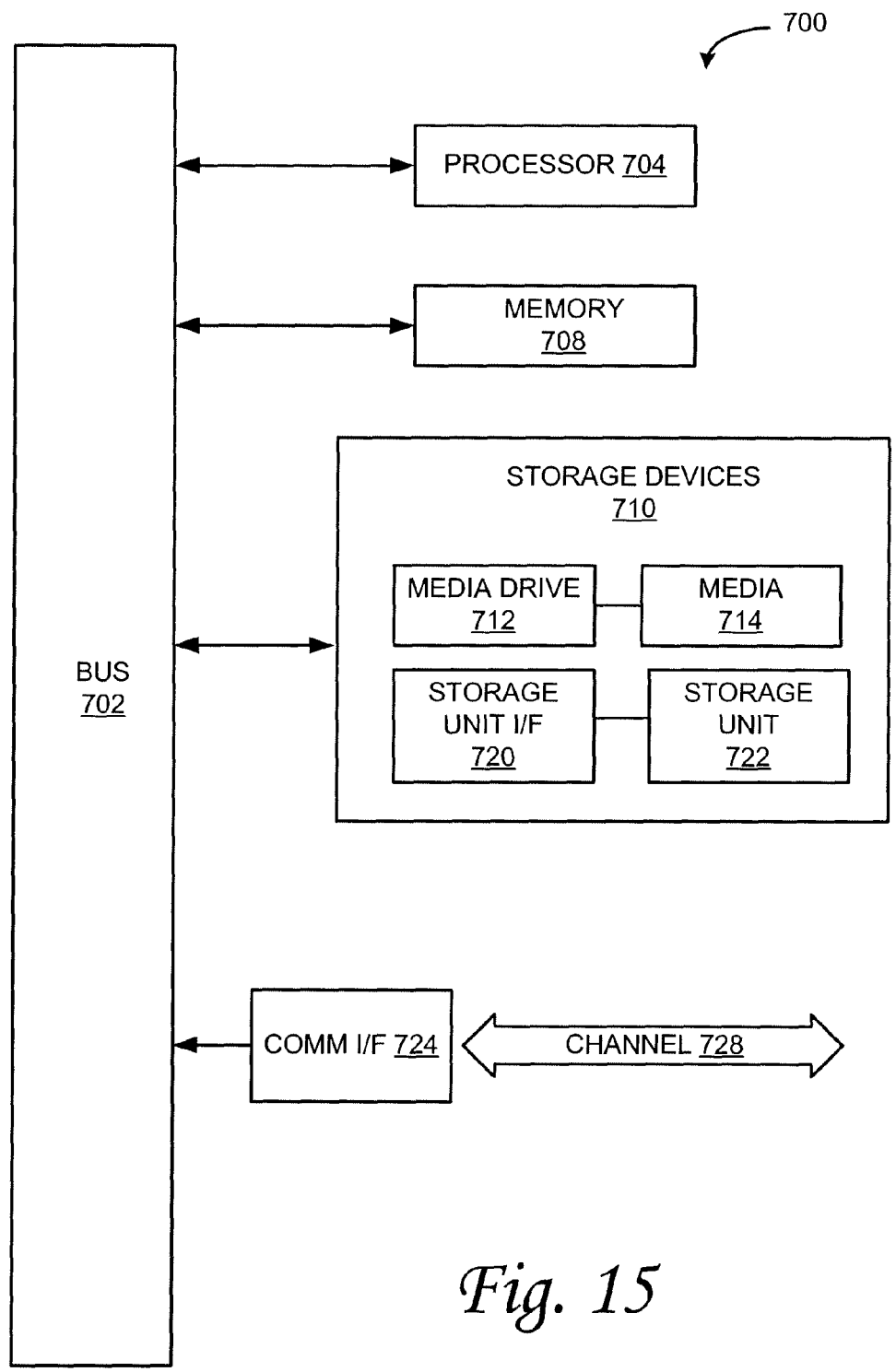
FIG. 15 is a diagram illustrating an example computing module in accordance with one embodiment of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 15. Various embodiments are described in terms of this example computing module 700. After reading this description, it will become apparent to a person skilled in the relevant art how to implement the invention using other computing modules or architectures.

Referring now to FIG. 15, computing module 700 may represent, for example, computing or processing capabilities found within desktop, laptop and notebook computers; handheld computing devices (PDAs, smart phones, cell phones, palmtops, etc.); mainframes, supercomputers, workstations or servers; or any other type of special or general purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, modems, routers, WAPs, and any other electronic device that might include some form or processing capabilities.

Computing module 700 might include one or more processors or processing devices, such as a processor 704. Processor 704 might be implemented using a general-purpose or special-purpose processing engine such as, for example, a microprocessor, controller, or other control logic. In the example illustrated in FIG. 15, processor 704 is connected to a bus 702 or other communication medium to facilitate interaction with other components of computing module 700.

Computing module 700 might also include one or more memory modules, referred to as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive. Accordingly, storage media 714, might include, for example, a hard disk, a floppy disk, magnetic tape, optical disk, a CD or DVD, or other fixed or removable medium that is read by, written to or accessed by media drive 712. As these examples illustrate, the storage media 714 can include a computer usable storage medium having stored therein particular computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, 802.XX or other interface), a communications port (such as for example, a USB port, IR port, RS232 port, Bluetooth interface, or other port), or other communications interface. Software and data transferred via communications interface 724 might typically be carried on signals, which can be electronic, electromagnetic, optical or other signals capable of being exchanged by a given communications interface 724. These signals might be provided to communications interface 724 via a channel 728. This channel 728 might carry signals and might be implemented using a wired or wireless medium. Some examples of a channel might include a phone line, a cellular phone link, an RF link, an optical link, a network interface, a local or wide area network, and other wired or wireless communications channels.

In this document, the terms "computer program medium" and "computer usable medium" are used to generally refer to media such as, for example, memory 708, storage unit 722, media 714, and signals on channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A video capture system configured to capture video sequences of a subject during an activity, the video capture system comprising:
   a first communication module configured to receive from first and second content capture devices first and second sets of successive frames of video image data respectively, each capture device having a defined coverage area in an activity location;
   a second communication module configured to receive tracking information indicating a position of the subject in the activity location and timing information associated with the tracking data;
   storing the frames of video image data as image data having an associated coverage area and having ascertainable timing information; and
   a content selection module coupled to the first and second communication modules and configured to determine locations of the subject in the defined coverage area based on the tracking information, determine times at which the subject was at the determined locations based on the timing information, identify which content capture devices captured image data of the subject based on the determined locations, identify frames from the determined image capture devices that correspond to the identified times, and using the identified content capture devices and times to select automatically first and second segments of the image data from first and second sets of successive frames of video image data, respectively, and to assemble automatically the selected segments into a video sequence of the subject.

2. The video capture system of claim 1, wherein the first communication module is configured to receive image data from at least one additional content capture device, said at least one additional capture device having a defined coverage area in the activity location.

3. The video capture system of claim 1, wherein the first and second segments of image data comprise a plurality of frames of image data corresponding to the times the subject is in the respective defined coverage areas of the first and second content capture devices.

4. The video capture system of claim 1, wherein the content selection module is further configured to identify a subset of the image data from first and second sets of successive games of video image data wherein different subsets of image data are determined by the content selection module to track the subject's movement across the frame.

5. The video capture system of claim 4, wherein the subset of image data is selected as a defined sector of the frame.

6. The video capture system of claim 4, wherein the subset of image data is a range of pixels of a predetermined size.

7. The video capture system of claim 6, wherein the size of the range of pixels increases as the subject moves closer to the video camera.

8. The video capture system of claim 1, wherein the first and second content capture devices comprise first and, second video cameras, respectively, coupled to the first communication module and configured to capture the first and second sets of successive frames of video image data from the defined coverage area for the first and second video cameras.

9. The video capture system of claim 1, further comprising a tracking device configured to provide the tracking information.

10. The video capture system of claim 9, wherein the tracking device comprises:
   a position determination module configured to determine a position of the tracking device;
   a timing module configured to provide timing information relating to the determined positions; and
   a communications interface configured to communicate time-stamped position information to the content assembly device.

11. A method of capturing video content of an activity subject, comprising:
   obtaining a first set of successive frames of video images of a first defined coverage area in an activity location and frame timing information indicating when a given frame of the first set of successive frames of video images was captured;
   obtaining a second set of successive frames of video images a second defined coverage area and frame timing information indicating when a given frame of the second set of successive frames of video images was captured;
   obtaining tracking information indicating a plurality of locations of the subject in the activity location and further indicating the times at which the subject was at the plurality of locations;
   storing the video images and frame timing information as image data sets having an associated coverage area and having ascertainable timing information;
   correlating the tracking information with the defined coverage areas to determine one or more times at which the user was in the defined coverage areas and correlating these times with the frame timing information to determine which segments of the first and second sets of successive frames of video images correspond to times the user was in the first and second defined coverage area;
   selecting the determined segments of the first and second sets of successive frames of video images, respectively; and
   assembling automatically the selected segments into a video sequence of the subject.

12. The method of claim 11, further comprising storing video ages obtained and wherein assembling comprises retrieving a plurality of identified video image segments from storage for assembly into the video sequence.

13. The method of claim 11, wherein the determined segments of images comprise a plurality of frames of image data corresponding to the times the subject is in the respective defined coverage area.

14. The method of claim 11, further comprising identifying different subsets of image data from at least one of the first and second sets of successive frames of video images in response to changes in the location of the subject to track movement of the subject's image across a coverage area.

15. The method of claim 14, wherein the subset of image is selected as a defined sector of the frame.

16. The method of claim 14, wherein the subset of image data is a range of pixels of a predetermined size.

17. The method of claim 16, wherein the size of the range of pixels increases as the subject moves closer to the video camera.

18. The method of claim 11, wherein the video image data is received from a plurality of content capture devices, each capture device having a different defined coverage area in the activity location.

19. The method of claim 11, wherein assembling comprises retrieving the identified image data segments from storage for assembly into the video sequence.

20. A method of capturing video content of an activity subject, comprising:
   obtaining a first set of frames of video from a first video capture device having a first coverage area in an activity location;
   obtaining a second set of frames of video from a video capture device having a second coverage area;
   storing the first and second sets of frames of video with video timing information indicating when the frames of video were captured;
   determining location information identifying a plurality of locations of the subject in at least one of the first and second coverage areas and a time at which the subject was at each location;
   selecting automatically a plurality of frames from the first set of frames of video corresponding to the timeframe in which the subject was in the first coverage area; and selecting automatically a plurality of frames from the second set of frames of video corresponding to the timeframe in which the subject was in the second coverage area;
   for the plurality of locations, assembling automatically the selected pluralities of frames from the first and second sets of frames of video into a video sequence of the subject.

21. The method of claim 20, wherein the locations of the subject are determined using a tracking device that generates tracking information and the tracking information is used to determine the plurality of locations.

22. The method of claim 20, further comprising:
   for a determined plurality of locations of the subject, correlating the times at which the subject was in the determined plurality of locations with the video timing information to determine which plurality of frames from the first and second sets of frames of video contain an image of the subject.

23. A computer program product for creating a video sequence of an activity subject, the computer program product comprising a non-transitory computer useable medium having computer program code recorded thereon, the computer program code comprising one or more instructions for causing a processing device to perform the functions of:
   obtaining a first set of successive frames of video image data from a first content capture device having a first coverage area in an activity location;
   obtaining a second set of successive frames of video image data from a second content capture device having a second coverage area;

storing the image data wherein the image data is stored as image data sets each having an associated coverage area and having ascertainable timing information;

obtaining tracking information indicating a position of the subject in the activity location;

obtaining timing information associated with the tracking data;

determining locations of the subject in the defined coverage area based on the tracking information and using the locations of the subject with defined coverage areas to identify which of the plurality of capture devices include image data of the subject; and correlating the timing information to select automatically first and second subsets of the image data from first and second sets of successive frames of video image data, respectively, and to assemble automatically the selected subsets into a video sequence of the subject;

wherein the correlation comprises using timing information associated with the tracking information to determine times at which the subject was at the determined locations, and using the determined times to identify image segments from the determined image capture devices that correspond to the identified times.

24. The computer program product of claim 23, wherein assembling comprises retrieving the identified image data segments from storage for assembly into the video sequence.

25. The computer program product of claim 23, wherein the segments of image data comprise a plurality of frames of image data corresponding to the times the subject is in the respective coverage areas of the first and second content capture devices.

26. The computer program product of claim 23, wherein the computer program code further comprises one or more instructions for causing a processing device to perform the function of identifying different subsets of image data from a frame of image data in response to changes in the location of the subject to track movement of the subject image across the frame.

27. The computer program product of claim 26, wherein the subset of image data is selected as a defined sector of the frame.

28. The computer program product of claim 26, wherein the subset of image data is a range of pixels of a predetermined size.

29. The computer program product of claim 28, wherein the size of the range of pixels increases as the subject moves closer to the video camera.

30. A computer program product for creating a video sequence of an activity subject, the computer program product comprising a non-transitory computer useable medium having computer program code recorded thereon, the computer program code comprising one or more instructions for causing a processing device to perform the functions of:

obtaining a first set of frames of video from a first video capture device having a first coverage area in an activity location;

obtaining a second set of frames of video from a video capture device having a second coverage area;

storing the first and second sets of frames of video with video timing information indicating when the frames of video were captured;

determining location information identifying a plurality of locations of the subject in at least one of the first and second coverage areas and a time at which the subject was at each location;

for selecting automatically a plurality of frames from the first set of frames of video corresponding to the timeframe in which the subject was in the first coverage area and and selecting automatically a plurality of frames from the second set of frames of video corresponding to the timeframe in which the subject was in the second coverage area;

for the plurality of locations, assembling automatically the selected pluralities of frames from the first and second sets of frames of video into a video sequence of the subject.

31. The computer program product of claim 30, wherein the locations of the subject are determined using a tracking device that generates tracking information and the tracking information is used to determine the plurality of locations.

32. The computer program product of claim 30, wherein the computer program code further comprises one or more instructions for causing a processing device to:

for a determined plurality of locations of the subject, correlating the times at which the subject was in the determined plurality of locations with the video timing information to determine which plurality of frames from the first and second sets of frames of video contain an image of the subject.

33. A video capture system configured to capture video sequences of a subject during an activity, the video capture system comprising:

a first video camera configured to capture a first set of successive frames of video images of a first coverage area in an activity location;

a second video camera configured to capture a second set of successive frames of video of a second coverage area;

a content storage module configured to store said first and second sets of frames of images with video timing information indicating when the frames of video were capture; and a processing system configured to determine location information identifying a plurality of locations of the subject in at least one of the first and second coverage areas and a time at which the subject was at each location, compare the identified plurality of locations of the subject with the coverage areas of the video cameras to identity which video camera captured images of the subject, use the timing information to identify a plurality of frames from the successive frames of data identified video cameras, and to select automatically, a plurality of frames from the first and second sets of successive frames of data corresponding to the timeframes the subject was at the plurality of locations, to assemble automatically the plurality of frames into a video sequence of the subject.

34. The system of claim 33, wherein the content assembly module comprises a processor, controller, ASIC, or PLA.

* * * * *

UNITED STATES PATENT AND TRADEMARK OFFICE
CERTIFICATE OF CORRECTION

PATENT NO. : 8,451,333 B2
APPLICATION NO. : 11/834545
DATED : May 28, 2013
INVENTOR(S) : Michael S. Sandler et al.

It is certified that error appears in the above-identified patent and that said Letters Patent is hereby corrected as shown below:

In the Claims

Claim 4, Column 22, line 66, "games" should read --frames--

Claim 12, Column 23, line 61, "ages" should read --images--

Claim 15, Column 24, line 6, "subset of image is" should read --subset of image data is--

Claim 20, Column 24, line 34, "selecting" should read --for; selecting--

Claim 30, Column 26, line 8, "and and" should read --and; and--

Signed and Sealed this
Second Day of July, 2013

Teresa Stanek Rea
*Acting Director of the United States Patent and Trademark Office*